United States Patent
Dodge et al.

(10) Patent No.: US 11,830,102 B2
(45) Date of Patent: Nov. 28, 2023

(54) SYNCHRONIZED DATA CHAINING USING ON-CHIP CACHE

(71) Applicant: Google LLC, Mountain View, CA (US)

(72) Inventors: Benjamin Dodge, San Jose, CA (US); Jason Rupert Redgrave, Mountain View, CA (US); Xiaoyu Ma, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/943,047

(22) Filed: Sep. 12, 2022

(65) Prior Publication Data

US 2023/0005095 A1 Jan. 5, 2023

Related U.S. Application Data

(63) Continuation of application No. 16/609,084, filed as application No. PCT/US2018/063778 on Dec. 4, 2018, now Pat. No. 11,443,402.

(Continued)

(51) Int. Cl.
*G06T 1/20* (2006.01)
*G06T 1/60* (2006.01)
(Continued)

(52) U.S. Cl.
CPC ............. *G06T 1/20* (2013.01); *G06F 13/28* (2013.01); *G06F 15/7825* (2013.01); *G06T 1/60* (2013.01)

(58) Field of Classification Search
CPC ... G06T 1/20; G06T 1/60; G06F 13/28; G06F 15/7825
(Continued)

(56) References Cited

U.S. PATENT DOCUMENTS 9,990,287 B2 * 6/2018 Raikin .................... G06T 1/20
2012/0206461 A1 8/2012 Wyatt et al.
(Continued)

FOREIGN PATENT DOCUMENTS

CN 107070863 8/2017
CN 107111585 8/2017

OTHER PUBLICATIONS

Office Action in Chinese Appln. No. 201880034685.8, dated Nov. 23, 2022, 13 pages (with English translation).
(Continued)

*Primary Examiner* — Jacinta M Crawford
(74) *Attorney, Agent, or Firm* — Fish & Richardson P.C.

(57) ABSTRACT

Methods, systems, and apparatus, including computer programs encoded on a computer storage medium, for generating, by an image sensor of a computing device, frame data comprising sub-frames of image pixel data. A first resource of the system-on-chip provides the frame data to a second resource of the system-on-chip. The frame data is provided to the second resource using a first data path included in the system-on-chip. The first resource provides a token to the second resource using a second data path included in the system-on-chip. A processor of the system-on-chip, uses the token to synchronize production of sub-frames of image pixel data provided by the first resource to the second resource and to synchronize consumption of the sub-frames of image pixel data received by the second resource from the elastic memory buffer.

16 Claims, 4 Drawing Sheets

Related U.S. Application Data (60) Provisional application No. 62/594,264, filed on Dec. 4, 2017.

(51) Int. Cl.
    *G06F 13/28*     (2006.01)
    *G06F 15/78*     (2006.01)

(58) Field of Classification Search
    USPC ......................................................... 345/541
    See application file for complete search history.

(56) References Cited

U.S. PATENT DOCUMENTS

| | | |
|---|---|---|
| 2012/0207208 A1 | 8/2012 | Wyatt et al. |
| 2012/0236013 A1 | 9/2012 | Wyatt et al. |
| 2012/0242671 A1 | 9/2012 | Wyatt et al. |
| 2012/0249563 A1 | 10/2012 | Wyatt et al. |
| 2016/0335734 A1 | 11/2016 | Lee |
| 2017/0124678 A1 | 5/2017 | Song |
| 2018/0285105 A1* | 10/2018 | Wang .................... G06F 9/3834 |

OTHER PUBLICATIONS

International Preliminary Report on Patentability in International Appln. No. PCT/US2018/063778, dated Jun. 18, 2020, 7 pages.
International Search Report and Written Opinion in International Appln. No. PCT/US2018/063778, dated Mar. 1, 2019, 12 pages.
Notice of Allowance in European Appln. No. 18830075.0, dated Jun. 17, 2021, 7 pages.
Office Action in European Appln. No. 18830075.0, dated Dec. 11, 2020, 6 pages.
Notice of Allowance in Chinese Appln. No. 201880034685.8, dated Feb. 16, 2023, 4 pages (with English translation).

\* cited by examiner

SYNCHRONIZED DATA CHAINING USING ON-CHIP CACHE

CROSS-REFERENCE TO RELATED APPLICATIONS

This application is a continuation application of, and claims priority to, U.S. application Ser. No. 16/609,084, filed on Oct. 28, 2019, which is a national stage application under 35 U.S.C. § 371 and which claims priority to International Application No. PCT/US2018/063778, filed on Dec. 4, 2018, which claims the benefit under 35 U.S.C. § 119(e) of U.S. Provisional Application No. 62/594,264, filed on Dec. 4, 2017. The disclosures of the prior applications are considered part of and are incorporated by reference in the disclosure of this application.

FIELD

This specification relates to computing processes for a system-on-chip.

BACKGROUND

Computing devices can include at least one system-on-chip component having a memory system and a communication network. For example, some mobile computing devices may include a cache, a direct memory access unit (DMA), static/dynamic random access memory (SRAM/DRAM), or combinations of each. Computing devices may perform data processing functions by using DMAs to execute memory write and memory read operations. For example, computing devices may process image pixel data by using a DMA to access DRAM resources. The computing device can access the data and use an on-chip communication network to perform actions related to rendering an image for display at a computing device in response to touch input from a user.

SUMMARY

This application is directed toward a computing scheme where producer and consumer models of a user device are configured to more efficiently use a system level cache to perform sub-frame data sharing. The computing scheme involves using tokens and data flow characteristics of device resources to address latency and power consumption challenges that can arise when the user device processes various types of data (e.g., image data generated by an image sensor). A system level cache is used as a buffer that stores sub-frames of data that are exchanged between resources of the device, such as a producer resource and a consumer resource. For example, as data is exchanged, tokens are also passed to synchronize and manage how sub-frames of data move between a data producer and a data consumer.

One aspect of the subject matter described in this specification can be embodied in a computer-implemented method. The method includes, generating, by an image sensor of a computing device, frame data comprising sub-frames of image pixel data and providing, by a first resource of the system-on-chip, the frame data to at least one second resource of the system-on-chip, wherein the frame data is provided to the at least one second resource using an elastic memory buffer and a first data path included in the system-on-chip. The method further includes providing, by the first resource of the system-on-chip, a token to the at least one second resource of the system-on-chip, wherein the token is provided to the at least one second resource using a second data path included in the system-on-chip. The method also includes, using, by a processor of the system-on-chip, the token provided using the second data path to: i) synchronize production of sub-frames of image pixel data provided by the first resource to the at least one second resource; and ii) synchronize consumption of the sub-frames of image pixel data received by the at least one second resource from the elastic memory buffer.

These and other implementations can each optionally include one or more of the following features. For example, in some implementations, the method further includes: providing, by the at least one second resource of the system-on-chip and using the second data path, a return token to the first resource, wherein the return token corresponds to the token provided by the first resource, and the return token is used along with the token to synchronize production of the sub-frames of image pixel data.

In some implementations, the first resource is a producer resource that uses a producer direct memory access unit to: i) provide the frame data using the first data path; ii) provide the token using the second data path; and iii) receive the return token using the second data path. In some implementations, the at least one second resource is a consumer resource that uses a consumer direct memory access unit to: i) consume the frame data provided using the first path; ii) receive the token provided using the second path; and iii) provide the return token using the second data path.

In some implementations, the processor allocates a variable amount of memory included in the elastic memory buffer, the memory being used for transfers of sub-frame data between multiple respective producer-consumer pairs; and the processor adjusts an initial amount of allocated memory based on a quantity of producer-consumer pairs that actively transfer sub-frame data, and wherein the sub-frame data has a data size that is less than a threshold data size.

In some implementations, the first resource provides the frame data to the at least one second resource via the first data path based on a sub-frame data consumption rate of the at least one second resource, wherein the sub-frame data consumption rate is computed by the processor at least by using the return token.

In some implementations, the method further includes: i) determining, by the processor and using the return token, a production rate by which the first resource is required to produce frame data to synchronize production of the sub-frames of image pixel data; and ii) providing, by the first resource, the frame data based on the determined production rate.

In some implementations, the method further includes: i) determining, by the processor and using the token, a consumption rate by which the at least one second resource is required to consume sub-frames of data to synchronize consumption of the sub-frames of image pixel data; and ii) consuming, by the at least one second resource, the sub-frames of data based on the determined consumption rate.

In some implementations, the first path and the second path are part of the same data communications network included in the system-on-chip. In other implementations, the second path is formed at the system-on-chip using one of multiple virtual channels included in the system-on-chip.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular implementations and can result in one or more of the following advantages. The described subject matter includes a computing scheme where producer and consumer models are configured to more efficiently use a system level cache for sub-frame data sharing, relative to conventional computing schemes used by an electronic device. The computing scheme described in this document leverages data flow characteristics of memory resources in a computing device to address latency and power consumption challenges that arise during certain data processing and memory access operations.

For example, the computing scheme includes coupling a producer and consumer at a finer grain than full data frames. Based on this coupling, a footprint of data is minimized to enable elastic buffering of sub-frame data in a system level cache. Customized caching features allow for the cache to be used as a scratch elastic buffer without requiring writing back data that is already consumed to DRAM or data that is no-longer-needed data to DRAM. The described subject matter can be implemented to realize multiple computing efficiencies over current/conventional on-chip systems. For example, the computing scheme of this document enables reduced latency to user input, increased on chip system throughput, reduced processor utilization, and improved power consumption.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
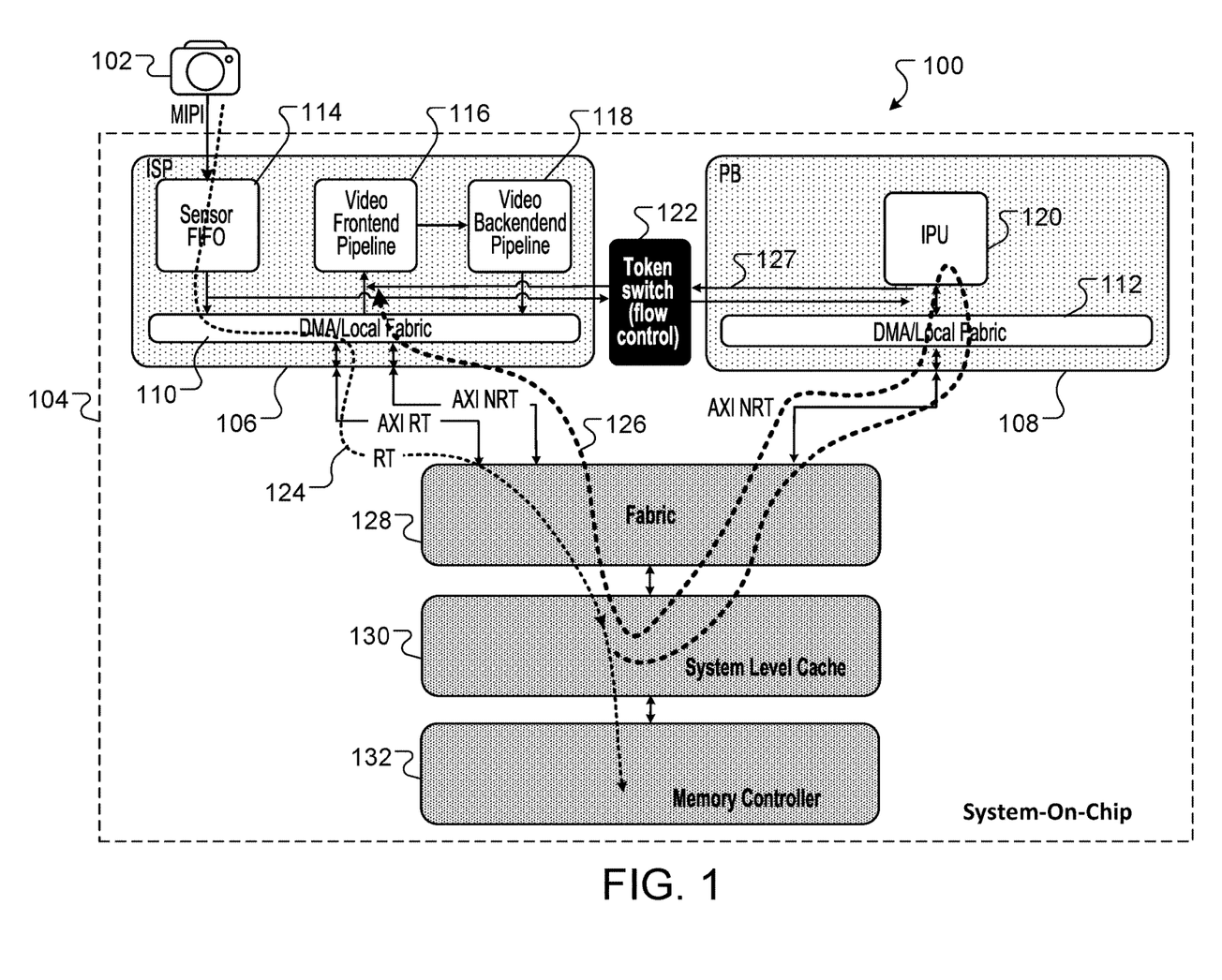
FIG. 1 is a block diagram of a computing system for performing data chaining using on-chip memory resources.

FIG. 1 shows a block diagram of a computing system 100 for performing data chaining using on-chip memory resources. System 100 includes a user device 102 and computing resources that form a system on-chip (SoC) 104 ("SoC 104"). In some implementations, SoC 104 is located in user device 104. SoC 104 generally includes an image signal processor (ISP) 106 ("ISP 106"), a processing block (PB) 108 ("PB 108"), a fabric 128, a system level cache (SLC) 130 ("SLC 130"), and a memory controller 132. ISP 106 includes a first direct memory access unit 110 ("DMA 110"), an image sensor 114, a frontend data pipeline 116, and a backend data pipeline 118. PB 108 includes a second direct memory access unit 112 ("DMA 112") and an image processor unit (IPU) 120 ("IPU 120").

Although described herein with reference to image sensors and image pixel data, computing processes described in this specification can be applied to the processing of various other types of data. For example, a user device can leverage the described computing scheme to synchronize data produced and consumed between respective resources of the device, e.g., audio data between an audio sensor and a digital signal processor, to realize improvements in data processing latency and device power consumption.

Sensor 114 generates image pixel data that is transferred and/or stored within system 100 using various memory and data processing resources of SoC 104. For example, pixel data moves, or flows, within SoC 104 based on control signals generated by each of DMA 110 and DMA 112. To facilitate data transfers, DMA 110 and 112 execute master control logic for managing and executing memory read operations and memory write operations within SoC 104. For example, each of DMA 110 and 112 can function as a DMA master that generates control signals for managing the production and consumption of pixel data.

In some implementations, ISP 106 is a producer of image pixel data and DMA 110 is a DMA master that manages flow control requirements for data produced by ISP 106, while PB 108 is a consumer of image pixel data and DMA 112 is a DMA master that manages flow control requirements for data consumed by PB 108. In alternative implementations, ISP 106 may be a consumer of image pixel data and DMA 110 is a DMA master that manages flow control requirements for data consumed by ISP 106, while PB 108 may be a producer of image pixel data and DMA 112 is a DMA master that manages flow control requirements for data produced by PB 108. Fabric 128 interacts at least with DMA 110 and DMA 112 to move image pixel data within system 100.

DMA 110 provides image pixel data to frontend pipeline 116. Image pixel data is received and processed at pipeline 116 before being transferred to backend pipeline 118 where additional pixel data processing operations can occur. DMA 110 causes processed pixel data to be moved or transferred to various other memory and data processing resources of SoC 104. Pixel data processed using pipelines 116 and 118 can represent frame data produced by ISP 106 for consumption by PB 108. In some implementations, frame data produced by ISP 106 can form items of digital or media content, such as video stream content or digital image/photo content. For example, PB 108 receives or consumes frame data and uses IPU 120 to generate representations of media content that can be displayed at user device 102.

In one implementation, connecting two DMA masters, e.g., DMA 110, 112, in a producer and consumer data flow model can involve double buffering the frame data to fully utilize the producer and consumer resources and meet use case requirements of a computing system. However, in some multimedia use cases, double buffering can introduce frame delays between production and consumption and increase processor latency. In some instances, when DMA masters are connected to user-controlled inputs (e.g., touch-sensitive devices, digital cameras, etc.) compound frame delays can occur and degrade user experience. In addition, double buffering typically requires write operations and read operations of large buffers to DRAM resources of a system and there is often a direct system power cost that is associated with these DRAM transfers.

Further, to meet the DRAM bandwidth needs of a given use case, a system may have to run at a higher processor operating point (e.g., frequency and voltage) thereby reducing the system's power efficiency. In some implementations, double buffering may present data flow control challenges. For example, when a producer-consumer pair exchanges data across a frame, system 100 must ensure that the frame has been produced completely before a consumer receives a signal indicating that consumption of the frame data can occur.

To address power and latency challenges with frame data transfers, a computing scheme/process is described where producer and consumer models are configured to efficiently use SLC 130 for sub-frame data sharing. SLC 130 can be memory embedded at, or integrated in, a microprocessor and for storing information accessed by SoC 104. The microprocessor can be an example processing unit as described in this document, e.g., a central processing unit (CPU) or graphics processing unit (GPU). In some implementations, SLC 130 is a CPU or GPU cache used by a processing unit of a system 100 (or SoC 104) to reduce an amount of time and/or energy that may be required to access data from a main memory of system 100.

The computing scheme leverages data flow characteristics of memory resources of user device 102 to address latency and power consumption challenges that can arise when processing frame data. The computing scheme includes coupling a producer and consumer pair (e.g., ISP 106 and PB 108) at a finer grain than full data frames. Based on this coupling, a footprint of transfer frame data is minimized to enable elastic buffering of the data in a SLC 130. Customized caching features allow for SLC 130 to be used as a scratch elastic buffer without requiring writing back consumed or no-longer-needed (dirty) data to DRAM.

Using the described techniques to couple producer and consumer pairs for sub-frame data transfers results in reduced processor latency as well as reductions in data flow footprint and transient storage needs. In some implementations, the computing scheme can be implemented to keep end-to-end latency between a producer and a consumer smaller than full frame latency. A net effect of computing process is that bandwidth to DRAM can be reduced and any user-visible frame latency can be also reduced. The described flow control scheme can involve implementing certain modifications to traditional producer-consumer DMAs to maximize energy savings and reduced latency for a sub-frame data sharing model.

Referring again to FIG. 1, producer and consumer DMAs 110, 112 are configured to issue their respective read and write operations to SLC 130 and other buffering resources included in the memory system of SoC 104. For example, each of DMAs 110, 112 can issue read/write operations through traditional mechanisms and interfaces, such as fabric 128 and memory controller 132. A flow control mechanism can be added between the producer and consumer DMA masters for use in synchronizing frame data exchanges and transfers between a producer-consumer pair. The flow control mechanism ensures that the consumer does not race ahead of the producer or consume frame data faster than a rate at which the producer produces the data. Likewise, the flow control mechanism can also ensure that the producer does not race ahead of the consumer or produce frame data faster than a rate at which the consumer consumes the data.

As a producer DMA, e.g., DMA 110, writes image pixel data to the memory system of SoC 104, the producer DMA uses flow control tokens to ensure that certain sub-frames of pixel data are available and/or globally visible. For example, a processor device of system 100 can execute programmed instructions for a specific flow control computing scheme. The computing scheme is used to control the flow of sub-frame data within SoC 104 and to control the distribution of synchronization tokens to regulate and manage the flow of sub-frame data within SoC 104. For example, the control scheme can cause the producer DMA to generate control signals for emitting or passing synchronization tokens received by a consumer, e.g., PB 108. Alternatively, the control scheme can cause a consumer DMA, e.g., DMA 112, to generate control signals for emitting or passing synchronization tokens to a producer, e.g., ISP 106.

Synchronization tokens provided by a producer to a consumer can signify completed bytes or indicate that production of sub-frame data is complete. Likewise, synchronization tokens provided by a consumer to a producer can signify completed processing of bytes or indicate that consumption of sub-frame data is complete. In some implementations, a consumer DMA only proceeds to issue memory system requests (e.g., for reading data from a memory resource) when the consumer DMA detects that it has a sufficient token(s) to initiate the request. In other implementations, when a consumer completes work on a portion of frame data, the consumer can release one or more tokens back to the producer that may have provided the tokens. Hence, this token based flow control mechanism enabled by the control scheme is configured for use by both the producer and the consumer when required.

Synchronization tokens are transferred, moved, or otherwise passed throughout SoC 104 using a token switch network 122. Network 122 provides an interconnected data communications path for transferring synchronization tokens between computing resources of system 100. In some implementations, synchronization tokens are exchanged between a producer and a consumer using a token switch network 122 that is configured as a separate network or data path of SoC 104. For example, frame data, e.g., full-frame image pixel data or sub-frame image pixel data, can be transferred between resources of SoC 104 using a first data communications network, while synchronization tokens can be transferred between resources of SoC 104 using a second data communications network.

In some implementations, the second data communications network is different than, or separate from, the first data communications network. In other implementations, the second data communications network is the same as, or interconnected with, the first data communications network. As shown at FIG. 1, data communication line 124 can represent producer data being transferred within SoC 104, data communication line 126 can represent consumer data being transferred within SoC 104, and data communication line 127 can represent synchronization tokens being transferred within SoC 104. In some implementations, communication lines 124 and 126 are associated with the first data communications network, while communication line 127 is associated with the second, different data communications network.

Fabric 128 can be used to pass or move frame data and synchronization tokens within SoC 104. In general, fabric 128 is configured to support multiple simultaneous data connections between independent producer-consumer pairs of SoC 104 as well as between multiple different computing resources of SoC 104. In some implementations, fabric 128 is configured to have guaranteed forward progress across all resource connections that exist within SoC 104. In addition, to meet certain system latency requirements, fabric 128 can be also configured to have a bounded latency that is less than a threshold bound latency of the system 100 (e.g., less than approximately 500 nanoseconds (ns)).

As noted above, producer and consumer models use SLC 130 for sub-frame data sharing. Customized caching features of system 100 allow for SLC 130 to be used as a scratch elastic buffer without requiring extraneous write and read operations involving DRAM. In some implementations, to minimize overall latency and therefore reduce the frame data footprint of the elastic buffer in SLC 130, a computing scheme is configured to ensure a producer and consumer pair follow the same address walk order. Moreover, a detected differences in address walk order is identified or made coherent by the respective DMA(s) of the producer and the consumer. For example, if a producer is tiled in row-major order and the consumer is line-based also in row-major, the producer releases tokens after operations for a row of tiles has finished. In some implementations, tokens are released and consumed between producer-consumer pairs in quantized chunks to meet the respective processing needs of the producer and the consumer. The released tokens are provided to the consumer as a flow control mechanism to trigger or cause the consumer to begin obtaining and consuming the available data stored in the buffer.

In other implementations, to maximize DRAM bandwidth savings, SLC 130 is configured to support one or more mechanisms to minimize, or entirely avoid, both missing a cache on data-chained reads and writing data-chained data back to DRAM. The control scheme can be configured to reduce interference between use cases in which data flows using DRAM and use cases in which sub-frame data-chaining occurs through SLC 130. For example, potentially high bandwidth data-chained flows can be configured to occur using one or more separate virtual channels of SoC 104. For example, SoC 104 can include multiple separate virtual channels (VCs) that are configured so high bandwidth data-chained flows cannot block, or be blocked, by other VCs that are making use of DRAM based data transfers. In some implementations, at least one VC can be used exclusively for sub-frame data chaining as well as for low-latency central processing unit (CPU) requests. In other implementations, SoC 104 can have a bus topology such that these different request sources can effectively be on separate physical channels when data chaining operations achieves the expected high hit rates.

In some implementations, FIG. 1 represents an operating scenario in which sensor frame data is flowing to PB 108, in real-time (RT) so as to represent real-time sensor frame data. In this operating scenario, system 100 supplies or provisions real-time bandwidth requirements measured over time windows on the order of microseconds (μs) (e.g., approximately 10 μs). Likewise, system 100 can provision sufficient bandwidth to meet the average data frame needs of these real time (or non-real-time) use cases on the order of milliseconds (ms) (e.g., 10 ms). In some implementations, the same bandwidth is delivered over windows on the order of approximately 100 μs. For typical line times and bytes-per-pixel, 100 us of real-time data can have a footprint that ranges from approximately 100 kilobytes (KB) to 200 KB (e.g., 100 μs*5,000 pixels per line*1.5 Bpp/5 μs per line). When SLC 130 can accommodate this data footprint, the real-time frame data stream from sensor 114 may be terminated at SLC 130/DRAM without requiring the consumer to also consume the frame data in real-time.

Figure 2:
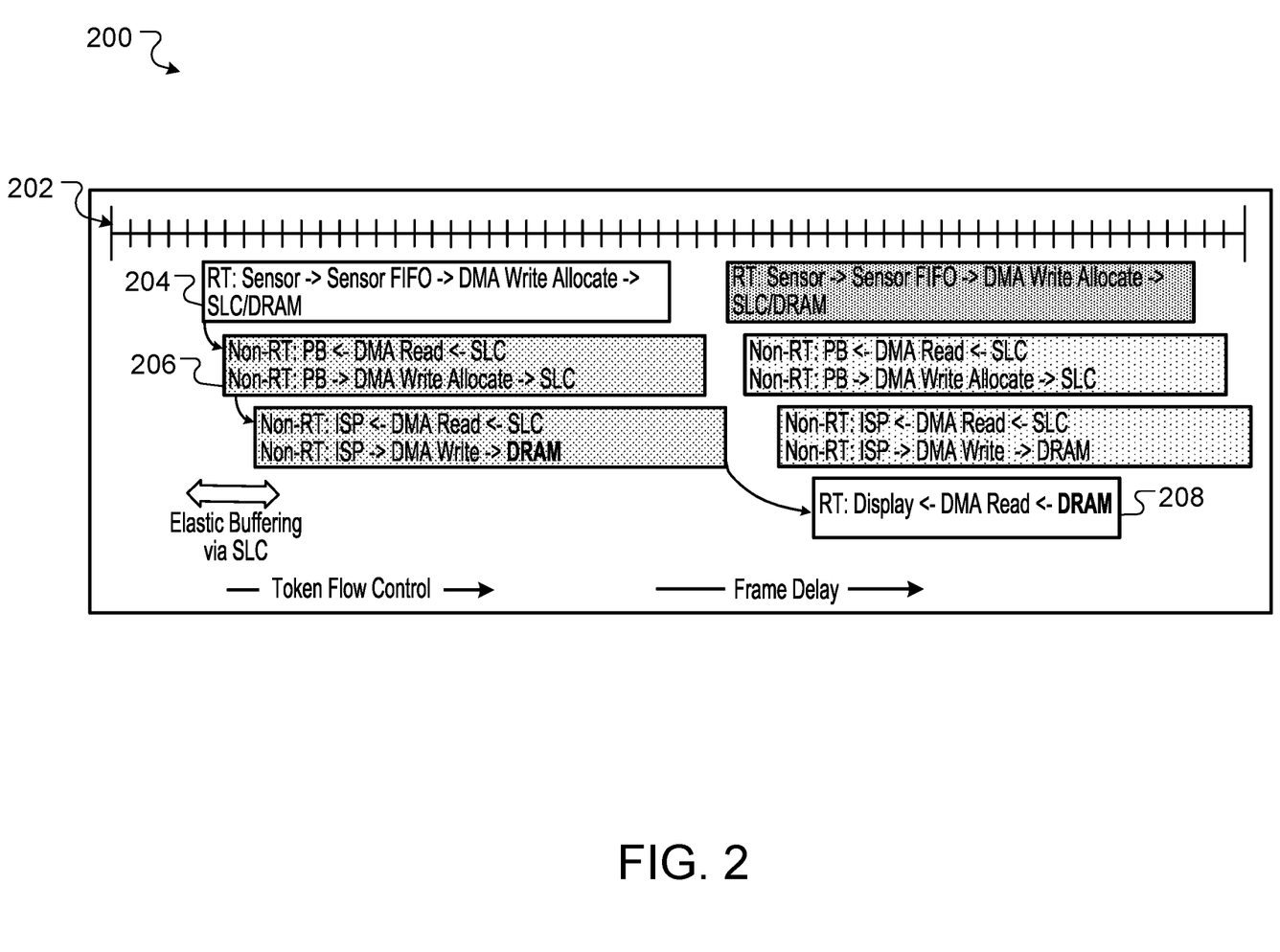
FIG. 2 shows example visuals of sub-frame data chaining.

FIG. 2 shows example visuals of a data flow diagram 200 that are associated with sub-frame data chaining. As shown, a data frame 202 can include at least two sub-frame blocks 204, 206 that are chained for data transfer within SoC 104 using SLC 130. Data flow diagram 200 shows a three hop data flow process where the first two sub-frame hops (involving blocks 204 and 206) chain data from ISP 106 to PB 108, and from PB 108 to ISP 106, through SLC 130. In some implementations, the last frame data hop from ISP 106 to display block 208 can be a traditional frame-based data flow.

Figure 3:
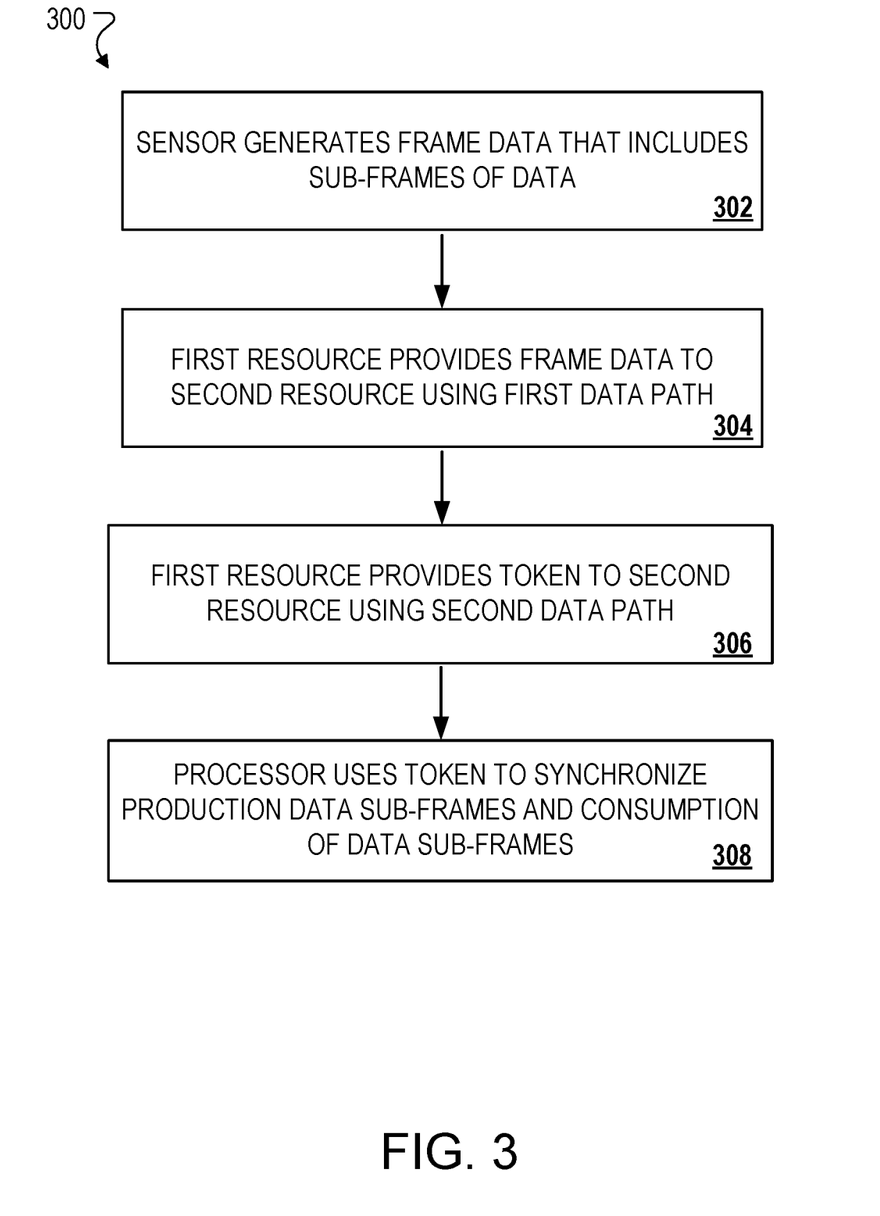
FIG. 3 is a flowchart of an example process for performing data chaining using on-chip memory resources.

FIG. 3 is a flowchart of an example process 300 for performing data chaining using on-chip memory resources. The process 300 includes a sensor of device 102 generating frame data that includes sub-frames of data (302). For example, image sensor 114 of the ISP 106 generates frame data that includes sub-frames of image pixel data for processing at system 100. The sub-frames of image pixel data are transferred, processed, and/or stored using the computing resources of system 100. In some implementations, the sub-frames of image pixel data are processed to render, at user device 102, graphical image representations of media content, such as video stream content or digital image/photo content.

A first resource of SoC 104 provides the frame data to a second resource of the system-on-chip (304). For example, ISP 106 can be a first resource of system 100 that provides the frame data to a second resource of system 100, while PB 108 can be a second resource of system 100 that receives the frame data from a first resource such as ISP 106. In some implementations, other components, or even combinations of components, in system 100 can represent a first resource or a second resource. For example, sensor 114, SLC 130, or IPU 120 can each represent a respective first resource or second resource that can provide or receive frame data.

In some examples, the frame data is provided to the second resource using an elastic memory buffer and a first data path included in the system-on-chip. For example, ISP 106 represents a first resource (e.g., a producer resource) that uses a producer DMA, such as DMA 110, to provide the frame data using the first data path and an elastic memory buffer that corresponds to SLC 130. The first data path can correspond to communication line 124, communication line 126, or a combination of both. Memory of SLC 130 is used for transfers of sub-frame data between multiple respective producer-consumer pairs of system 100. To facilitate the data transfers in a more efficient manner, an example processor of SoC 104 can vary an amount of allocated memory included in the SLC 130 that is used to move or transfer the frame data.

For example, a certain amount of memory may be initially allocated. Referencing the amount, the processor can adjust this initial amount of allocated memory based on a quantity of producer-consumer pairs that actively transfer sub-frame data at the SoC 104. The sub-frame data can have a data size that is less than a threshold data size, where the threshold data size is determined based on a memory capacity of the allocated memory or an overall memory capacity of the SLC 130.

The first resource provides a first token to the second resource using a second data path included in the system-on-chip (306). ISP 106 (e.g., first/producer resource) can provide a first token to PB 108 (e.g., second/consumer resource) using a data transfer network 122 that corresponds to the second data path of SoC 104. Further, a second resource of SoC 104 uses the second data path to provide a return token to the first resource. The return token is related to the first token provided by the first resource. As described herein, the return token is used along with the first token to synchronize production and consumption of the sub-frames of data to render image content at a display of a user device or to output audio using a speaker of the user device.

In some implementations, as frame data is exchanged between the first and second resources, one or more tokens are also passed between the first and second resources to synchronize and manage the transfer of data sub-frames between resources that are producers of data and other resources that are consumers of data.

A processor of the system-on-chip, uses the first token to synchronize production of the sub-frames of image pixel data provided by the first resource to the second resource and to synchronize consumption of the sub-frames of image pixel data received by the second resource from the elastic memory buffer (308). For example, as a producer DMA 110 writes image pixel data to memory of SoC 104, the producer DMA uses flow control tokens to ensure certain sub-frames of pixel data are available and/or globally visible for processing or consumption by other resources of SoC 104. The other resources include at least SLC 130 and consumer DMA 112. In some cases, the first token represents a synchronization token provided by a producer to a consumer to signify completed bytes or indicate that production of sub-frame data is complete. Likewise, the return token represents a synchronization token provided by a consumer to a producer to signify completed processing of bytes or to indicate that consumption of sub-frame data is complete.

Figure 4:
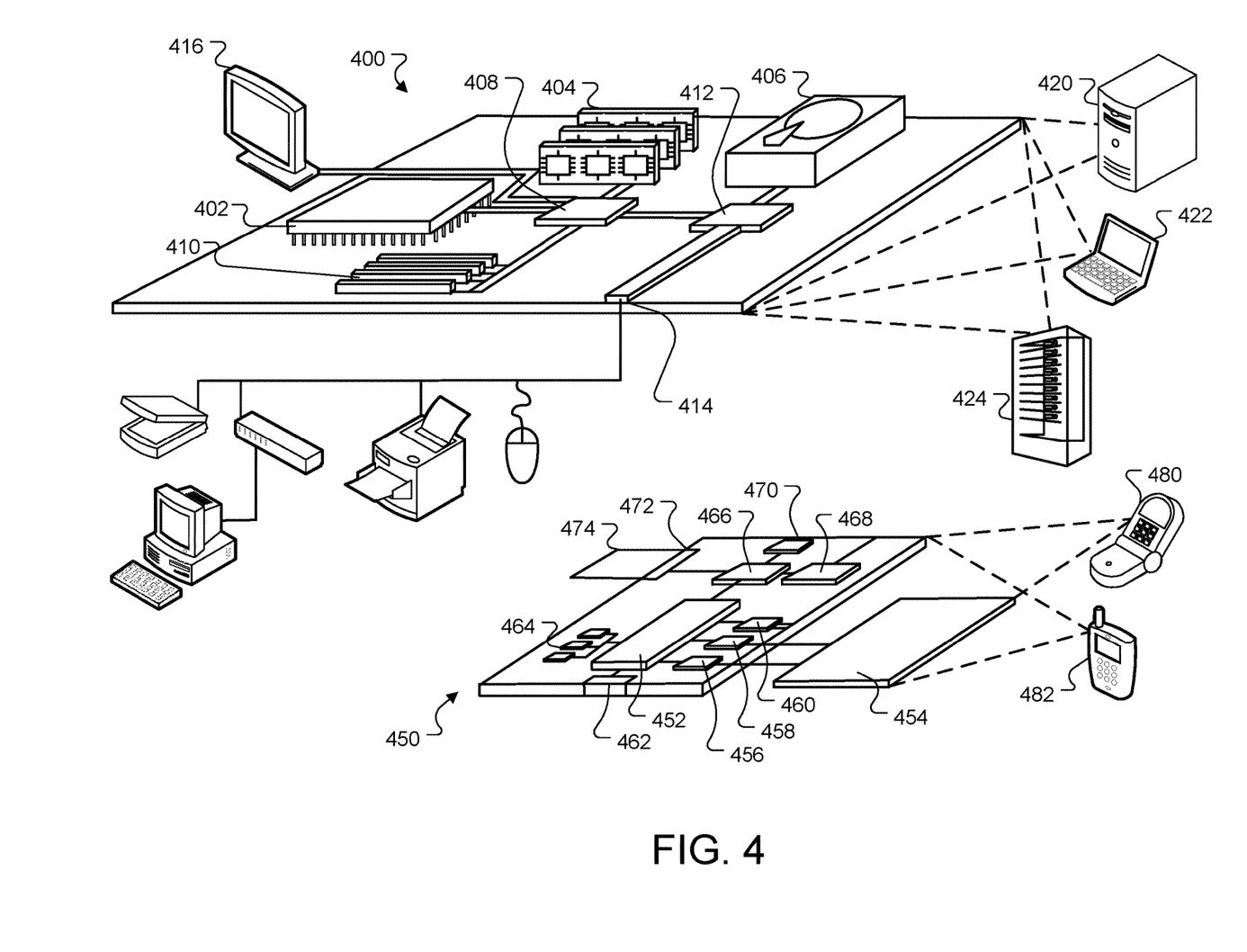
FIG. 4 is a block diagram of a computing system that can be used in connection with computer-implemented methods described in this specification.

FIG. 4 is a block diagram of computing devices 400, 450 in which the systems and methods described in this document may be advantageously implemented. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smart watches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450. The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As discussed above, systems and techniques described herein can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system-on-a-chip comprising:
   a pair of processing devices including a first processing device and a second processing device;
   a system-level cache configured to cache memory requests to a memory by the processing devices;
   a data communications network that is configured to carry data between the processing devices, the system-level cache, and the memory;
   a token switch network that is configured to carry synchronization data between the processing devices to control data sharing through the system-level cache by the processing devices,
   wherein the first processing device is configured to store data in the system-level cache through the data communications network, and to provide a token through the token switch network to the second processing device indicating availability of the data stored in the system-level cache, and
   wherein the second processing device is configured to receive the token through the token-switch network and, in response, read the data from the system-level cache through the data communications network without the second processing device reading the data from the memory.

2. The system of claim 1, wherein the token switch network is a different communications network than the data communications network.

3. The system of claim 1, wherein the first processing device is an image signal processor, and wherein the second processing device is a processing device that is configured to process data generated by the image signal processor.

4. The system of claim 1, wherein the first processing device is configured to generate audio data, and wherein the second processing device is configured to process the audio data generated by the first processing device.

5. The system of claim 1, wherein the first processing device and the second processing device are configured to use a same address walk order.

6. The system of claim 1, wherein the second processing device is configured to provide, to the first processing device using the token switch network, a token indicating that the data generated by the first processing device has been processed by the second processing device.

7. The system of claim 1, wherein the data generated by the first processing device and read by the second processing device from the system-level cache comprises sub-frame data that is smaller than an image frame of a camera communicatively coupled to the system-on-a-chip.

8. The system of claim 1, wherein the token switch network is a bidirectional communications network.

9. A method comprising:
   generating, by a first processing device of a system-on-a-chip, data to be processed by a second processing device of the system-on-a-chip;
   storing, by the first processing device, the generated data in a system-level cache of the system-on-a-chip using a data communications network of the system-on-a-chip, wherein the system-level cache is configured to cache memory requests to a memory by the first processing device and the second processing device;
   providing, by the first processing device to the second processing device using a token switch network of the system-on-a-chip, a token indicating the availability of the data stored in the system-level cache;
   receiving, by the second processing device, the token from the first processing device using the token switch network; and
   in response, reading, by the second processing device, the data from the system-level cache generated by the first processing device using the data communications network without reading the data from the memory.

10. The method of claim 9, wherein the token switch network is a different communications network than the data communications network.

11. The method of claim 9, wherein the first processing device is an image signal processor, and wherein the second processing device is a processing device that is configured to process data generated by the image signal processor.

12. The method of claim 9, wherein the first processing device generates audio data, and wherein the second processing device is configured to process the audio data generated by the first processing device.

13. The method of claim 9, wherein the first processing device and the second processing device are configured to use a same address walk order.

14. The method of claim 9, further comprising providing, by the second processing device using the token switch network to the first processing device, a token indicating that the data generated by the first processing device has been processed by the second processing device.

15. The method of claim 9, wherein the data generated by the first processing device and read by the second processing device from the system-level cache comprises sub-frame data that is smaller than an image frame of a camera communicatively coupled to the system-on-a-chip.

16. The method of claim 9, wherein the token switch network is a bidirectional communications network.

\* \* \* \* \*